United States Patent [19]

Grader et al.

[11] 4,352,740
[45] Oct. 5, 1982

[54] WATER OZONATION METHOD

[75] Inventors: Ronald J. Grader, East Amherst; Richard P. Johansen, Williamsville, both of N.Y.

[73] Assignee: Linde Aktiengesellschaft, Wiesbaden, Fed. Rep. of Germany

[21] Appl. No.: 119,671

[22] Filed: Feb. 8, 1980

[51] Int. Cl.$^3$ .............................................. C02F 1/78
[52] U.S. Cl. .................................. 210/760; 210/764; 422/28
[58] Field of Search ............... 210/604, 627, 631, 760, 210/764; 422/28

[56] References Cited

U.S. PATENT DOCUMENTS

| | | | |
|---|---|---|---|
| 3,660,277 | 5/1972 | McWhirter et al. | 210/604 |
| 3,732,163 | 5/1973 | Lapidot | 210/760 |
| 3,748,262 | 7/1973 | Lee et al. | 210/760 |
| 3,856,671 | 12/1974 | Lee et al. | 210/760 |
| 4,132,637 | 1/1979 | Key et al. | 210/604 |
| 4,178,239 | 12/1979 | Lowther | 210/604 |
| 4,256,574 | 3/1981 | Bhargava | 210/760 |

OTHER PUBLICATIONS

Rosen, "Ozone Generation & Its Relationship to Econ. App. of Ozone in Wastewater Treat.", *Ozone in Water Treatment*, Chap. 6, 1972, pp. 101–122.

Masschelein et al., "Perspectives on the Ozonation of Water from Oxygen-Enriched Air", *T.S.M. L'eau*, vol. 71, No. 8–9, 1976, pp. 385–399.

*Primary Examiner*—Peter A. Hruskoci
*Attorney, Agent, or Firm*—Millen & White

[57] ABSTRACT

A method for ozonation of a water stream by providing at least 70% by volume oxygen feed gas, generating 4–8% by wt. ozone in such gas by silent electric discharge with low power per unit ozone, contacting with water to dissolve ozone, and atmospherically venting ozone-depleted gas from the contacting.

5 Claims, 5 Drawing Figures

WATER OZONATION METHOD

BACKGROUND OF THE INVENTION

1. Field of the Invention

This invention relates to a method for ozonation of water with ozone generated in oxygen feed gas by silent electric discharge, and contacting the water and ozone-oxygen gas.

2. Description of the Prior Art

The water disinfection capabilities of ozone have long been recognized. Ozone has been used as a germicide for the sterilization of drinking water, and also for the tertiary treatment of a treated wastewater stream or effluent from an activated sludge or trickling filter plant. However, the high cost of ozone relative to the more economical alternative, chlorination, has generally limited its use. Nonetheless, the use of ozone in water treatment for example, has been increasing in recent years due to several of its unique properties which offer substantial advantages. For example, ozone is a very powerful oxidizing agent and many ozone reactions are much more rapid than chlorine reactions. Also, ozone has been shown to be a highly efficient germicide and virucide, and fortuitously leaves a beneficial oxygen residual as one reaction product. The advantages stemming from a residual dissolved oxygen content (D.O.) are well-known. Finally, the oxidized products remaining after ozonation are generally less toxic than the corresponding chlorinated or unoxidized products remaining after treatment with chlorine.

Most commercial ozone generators are of the silent electric discharge type. Such generators exhibit sharp variations in efficiency depending on the oxygen concentration of the feed gas and the ozone concentration of the generator product gas. For instance, although the production of ozone-in-oxygen gas containing about 4% ozone by weight is possible with many commerical ozone generators when operating with a high purity oxygen feed gas, i.e., about 90% oxygen (by volume), the generation of an ozone-in-oxygen-containing product gas with ozone concentrations above about 2% by weight is normally accompanied by a substantial economic penalty.

One commercially available ozone generator having ozone generation power characteristics generally superior to most commercial ozone generators is described and claimed in the following U.S. Pat. Nos. 3,784,898; 3,798,457; 3,875,035; 3,891,561; 3,899,682; 3,903,426; 3,954,586; 3,984,697; and 3,996,474 all to F. E. Lowther. This generator will be hereinafter referred to as the Lowther generator. However, even with this improved generator, operation in excess of 2–4% ozone concentration (by weight) in the oxygen-enriched product gas requires a substantial additional power expenditure and has not generally been practiced.

In addition to the cost of producing the ozone-in-oxygen-containing gas, an overall ozone contacting system must also include an air separation system for producing the oxygen-enriched feed gas for the ozone generator. Since most commercial ozone generators are typically operated to produce an ozone-in-oxygen-containing gas having about 1–4% ozone by weight, only a small fraction (i.e., about 4%) of the oxygen in the oxygen-enriched feed gas for the ozone generator is actually utilized to produce ozone. For this reason, the prior art has proposed a variety of water ozonation systems maximizing the utilization of the oxygen-enriched feed gas.

One such system, described in U.S. Pat. No. 3,660,277 to McWhirter et al, involves an oxygen-aerated secondary wastewater treatment. In this instance the patentees believe that it is advantageous to produce an oxygen-enriched feed gas stream of a sufficient size to satisfy not only the ozonation requirements of a treated wastewater stream, but also to satisfy the oxygen requirements for the secondary treatment of the raw wastewater stream as well. In the McWhirter et al system, the oxygen-enriched feed gas produced by the air separator may be initially divided into two streams. A first gas fraction may be fed directly to the secondary wastewater treatment portion of the system; while the other major, second gas fraction is fed directly into an ozone generator. The ozone-in-oxygen-containing gas produced by the ozone generator having an ozone concentration between 0.5% and 4.0% (by volume), i.e., below about 6% ozone (by weight) is used to disinfect in the ozone contacting stage, the treated wastewater stream (secondary effluent) discharged from the secondary treatment part of the process.

The ozone-depleted, oxygen-enriched gas discharged from the ozone contacting stage is then passed to the secondary treatment part of the system and combined with the optional first gas fraction of the oxygen-enriched feed gas as the oxygen-containing feed gas for secondary wastewater treatment. By using such a system, one can achieve a high overall utilization of the original oxygen-enriched feed gas produced by the air separator, e.g. on the order of 90–95% is possible.

One alternative to the simple integrated wastewater treatment-ozonation system of McWhirter et al is described in U.S. Pat. No. 4,132,637 to Key et al. As in the McWhirter et al system, the air separator in the Key et al system produces sufficient oxygen-enriched feed gas to satisfy both the ozonation requirements of the treated wastewater stream (secondary effluent), as well as the biological oxygenation requirements for the secondary treatment of the raw influent wastewater. However, a portion of the ozone-depleted, oxygen-enriched vent gas from the water contacting is dried and mixed with the portion of the oxygen-enriched feed gas fed directly to the ozone generator.

However, in many instances where ozonation of water is to be employed there will not be an adequate oxygen-aerated wastewater treatment or any other oxygen consumer available. To conserve oxygen-enriched gas in such cases, it has been common practice to recirculate or recycle the ozone-depleted, oxygen-enriched gas discharged from the ozone contacting stage after appropriate treatment steps (e.g. drying) back to the ozone generator for mixing with an appropriate make-up supply of an oxygen-enriched feed gas. This approach will hereinafter be referred to as the "classical recycle method". As will be hereinafter discussed in greater detail, the classical recycle method requires expensive equipment, additional power, and provides typically only 50–60% overall utilization of the oxygen in the feed gas.

It is an object of the present invention to provide a water ozonation method which does not require a secondary use for the ozone-depleted, oxygen-enriched gas from the ozone-water contacting.

Another object of the invention is to provide an improved water ozonation method with no secondary oxygen consumption which, in terms of overall equipment and power requirements plus oxygen utilization, is more effective than the classical recycle method.

A final object of this invention is to provide an ozone generation and water contacting method which is exceedingly simple in design, low in cost and high in reliability.

Other objects and advantages of this invention will be apparent from the ensuing disclosure and appended claims.

SUMMARY OF THE INVENTION

This invention relates to a method for ozonation of water with ozone generated in oxygen feed gas by silent electric discharge, and contacting the water and ozone-oxygen gas.

In its broadest aspect, we have surprisingly discovered that under a specific range of operating conditions for ozonation of a water stream the overall effectiveness is substantially enhanced by atmospherically venting the ozone-depleted oxygen-enriched gas discharged from the water-ozone contacting step rather than recovering and recycling this off-gas to the silent electric discharge-type ozone generator after appropriate treatment. More particularly, it has been found that if the ozone generation is relatively efficient from a power consumption standpoint (as measured by the ozone generation energy demand) and if the ozone dosage in the water stream is moderately low, that the quantity of oxygen lost, either as dissolved oxygen (in the disinfected water) or through off-gas atmospheric venting in the recycle loop (to prevent accumulation of diluent gas) is large relative to the total oxygen feed gas flow to the ozone generator. This dissolved and vented oxygen represents an additional oxygen production requirement for the classical recycle method over and above that required to merely replace the dissolved ozone (generated from feed oxygen). In fact this oxygen makeup gas requirement has been found to be the same order of magnitude as the overall oxygen-enriched feed gas requirement for an oxygen gas once-through system with atmospheric venting of off-gas, operated at a high ozone concentration in the oxygen-enriched feed gas and moderately low ozone dosage level in the resulting disinfected water.

More specifically the invention relates to a method for ozonation of a water stream by separating air to produce oxygen-enriched feed gas, generating ozone in the feed gas by silent electric discharge to provide ozone-containing feed gas, contacting the water stream and the ozone-containing feed gas to dissolve ozone and oxygen in the water stream, atmospherically venting ozone-depleted gas from the contacting, and discharging the ozonized and oxygenated water from the contacting.

In particular, the improvement of the invention comprises:

(a) producing at least 70% oxygen by volume as the oxygen-enriched feed gas;

(b) generating between 4% and 8% by weight ozone in the silent electric discharge such that the ozone generation figure, i.e., energy demand of merit $\eta$ in kwh/lb-$O_3$ is less than that defined by the equation (1) as follows:

$$\eta = 1/(0.34 - 0.033X) \quad (1)$$

where X is the ozone weight % concentration in the so-generated ozone-containing feed; and (c) performing said contacting of said water stream and said ozone-containing feed gas to dissolve between 0.5 ppm. and 8 ppm. ozone in said water stream.

As used herein, the expression "water stream" includes a stream of approximately drinking or process water quality which may, for example, require an ozone dose of less than 5 ppm. for treatment. "Water stream" also includes treated wastewater which is being ozonized by a dose greater than 4 ppm. for subsequent discharge into receiving water.

Also as used herein, the expression "oxygen utilization" includes not only the oxygen which is converted to ozone by silent electric discharge and thereafter used to treat the water stream, but also the oxygen appearing as dissolved oxygen in the gas-water contactor.

Finally, the expression "ozone utilization" includes not only the ozone reacting with contaminates in the water, but also ozone which is dissolved in the water and ultimately appears as dissolved oxygen.

DESCRIPTION OF THE PREFERRED EMBODIMENTS

Figures 1, 2:
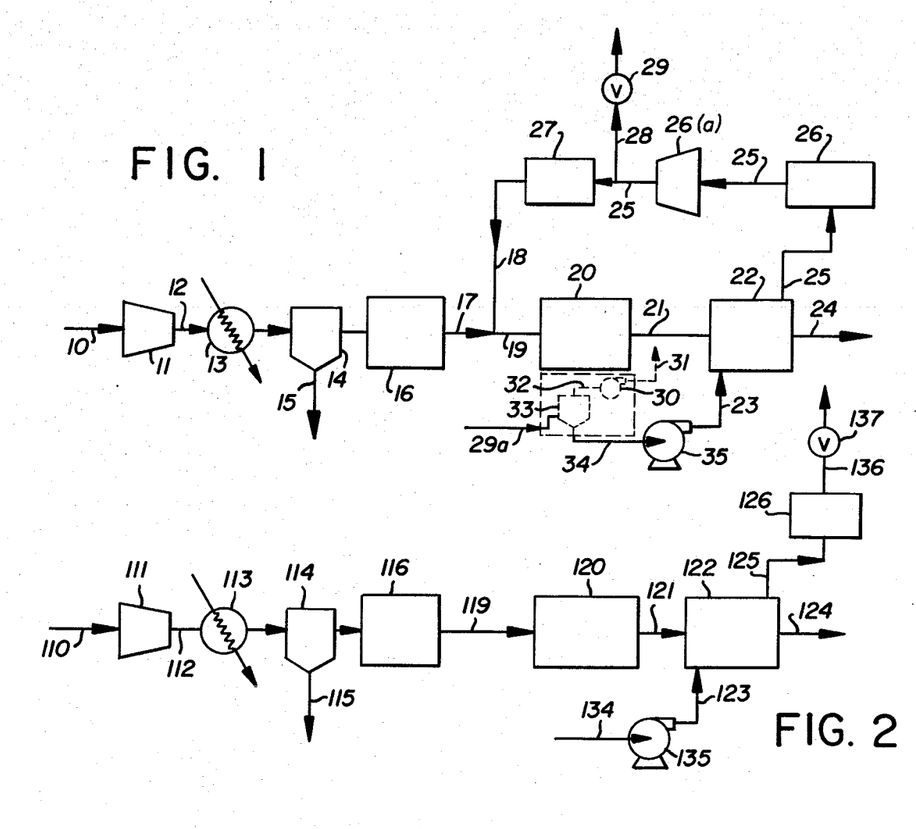
FIG. 1 is a schematic flowsheet of apparatus suitable for practicing the prior art classical recycle method for water ozonation.
FIG. 2 is a schematic flowsheet of apparatus suitable for practicing the water ozonation method of this invention.

Referring now to FIG. 1, the prior art classical recycle system, fresh air in conduit 10 is processed through compressor 11 to pressurize the gas to an appropriate pressure for the subsequent separation step to produce oxygen-enriched feed gas. The discharge pressure from compressor 11 may for example be 40 psig. The compressed air in conduit 12 flows to water chiller 13, and the resulting cooled compressed air with condensed water passes through conduit 12 into separator 14 where the water is removed through conduit 15.

The compressed air then passes into air separator 16. The later is typically accomplished by one of two approaches: a pressure swing adsorption process (PSA) or a cryogenic (low temperature) process. Either separation process typically produces an oxygen-enriched gas with a dew point below about $-80°$ C., which is known to improve operating efficiency of the ozone generator as compared with higher moisture content. The oxygen-enriched gas typically has a composition of 90–99% oxygen (by volume) and is discharged from air separator 16 into conduit 17. This gas is mixed with a recycle stream of ozone-depleted, oxygen-enriched contactor off-gas from conduit 18 and is fed through conduit 19 to ozone generator 20. Depending upon the oxygen content of the oxygen-enriched feed gas, the ozone-containing gas discharged from generator 20 in conduit 21 will normally have an ozone concentration in the range of about 1–4% by weight, typically about 2% ozone by weight.

The ozone-containing oxygen-enriched gas in conduit 21 flows into chamber 22 for contacting with a water stream introduced through conduit 23. The exact construction of contacting chamber may vary; for example it may be a countercurrent or a concurrent type utilizing either single or multiple stages. Normally, the design of the ozone contacting chamber is not a critical or controlling feature of the overall system, and any effective type of gas-liquid contacting apparatus can normally be used. For example, commercially available fixed submerged diffusers may be utilized.

The purified water stream, which also contains a fixed quantity of dissolved oxygen, depending upon the oxygen content of the ozone-in-oxygen-containing gas as well as the oxygen mass transfer efficiency in the ozone contacting chamber, exits the ozone contacting chamber 22 through conduit 24. A recycle off-gas composed of the ozone-depleted, oxygen-enriched gas, which also contains an increased nitrogen concentration due to the stripping of dissolved nitrogen from the influent water, is discharged from the ozone contacting chamber 22 through conduit 25. Because of the dissolved nitrogen, the recycle off-gas comprises no more than about 60 by volume $O_2$. This gas may optionally pass through an ozone destruct unit 26 to decompose any residual ozone. Thereafter, the recycle off-gas in conduit 25 flows by the action of compressor 26(a) into the drier 27. Compressor 26 provides suction on the ozone-water contacting chamber 22 so that the gas pressure in the contactor is at or below atmospheric thereby minimizing any ozone leakage, and also provides sufficient pressure in the off-gas recycle loop to flow the gas through to the feed conduit 19 of the ozone generator 20. The drier 27 functions to remove water evaporated into the gas stream during the contacting step in the ozone contacting chamber 22 and reduce the dew point of this recirculating gas to a proper level. Drier 27 typically consists of a two or three bed dessicant system well-known in the art. The dried gas in conduit 18 is then mixed with the oxygen-enriched feed gas from air separator 16.

As a result of the nitrogen and carbon dioxide gas which is stripped from the water purified in the ozone contacting chamber 22, the nitrogen concentration of the off-gas recirculating through conduits 25 and 18 steadily increases to a high equilibrium value. To prevent this nitrogen and carbon dioxide concentration from increasing to a level which would deleteriously affect the operation of ozone generator 20, a portion of this gas may be removed either intermittently or continuously from the recycle loop. For this reason, conduit 28 and valve 29 therein are provided for venting a portion of this recycle off-gas.

As an alternative to gas purging, it is also possible to prevent the accumulation or build-up of nitrogen and carbon dioxide in the off-gas recycle loop by subjecting the influent water stream in conduit 29a to a step of vacuum deaeration. In the vacuum deaeration stage illustrated in FIG. 1 by dash lines, the dissolved gases, predominantly nitrogen and carbon dioxide, are drawn from the water by vacuum pump 30 and vented from the system through conduit 31. Vacuum pump 30 is joined by conduit 32 to separator 33 receiving the water stream from conduit 29a. The vacuum deaerated water stream is flowed from separator 33 through conduit 34 by pump 35 to conduit 23 for introduction to ozone contacting chamber 22. Because of the expense and operational difficulties normally associated with a vacuum deaeration system, the aforedescribed gas purge system is most commonly used.

The off-gas recycle system is normally operated with any oxygen-enriched feed gas concentration for the ozone generator 20 of about 55% to 65% by volume $O_2$. It would be impossible to significantly raise the oxygen concentration above this level because of the inherent limitation on the oxygen concentration in the recycled off-gas by virtue of the nitrogen and other diluents. At this operating level, the system typically provides between about 50% and 60% overall utilization of the oxygen-enriched feed gas.

The prior art, as typified by U.S. Pat. No. 3,748,262, has also inserted a PSA type air separator directly into the closed-recycle loop and eliminated drier 27. While conceptually this process appears to offer many advantages relative to the classical recycle approach, the cost of removing the necessary carbon dioxide, nitrogen and water from the off-gas to allow the recycle of this gas back to the ozone generator has been found to be excessively expensive.

The ozone generation/ozone contacting prior art has also proposed to simply atmospherically vent the off-gas discharged from the ozone contacting stage. However, this off-gas venting process has apparently never been commercially employed because it was generally assumed that such a system would be universally inferior to the aforementioned treatment approaches. In fact, the overall oxygen utilization of such a process is below about 30% as compared with the 50–60% available with the classical recycle method.

Accordingly, only the classical recycle system illustrated in FIG. 1 has been commercially employed in those instances where an integrated use for the ozone-depleted oxygen-enriched gas discharged from the ozone contacting chamber is not available.

In the FIG. 2 embodiment of this invention, for comparison purposes elements corresponding to those in FIG. 1 are assigned the same identification number plus one hundred. An air stream in conduit 110 is pressurized in compressor 111, preferably to sufficient pressure to operate the succeeding air separator 116. The compressed air issuing from compressor 111 passes through conduit 112 to water chiller 113. The cooled compressed air, now containing condensed water, is passed through conduit 112 into separator 114 where the condensed water is removed through conduit 115. The dry compressed air then passes through conduit 112 into the air separator 116. Oxygen production can be provided by any of the well-known treatment approaches including pressure swing adsorption (PSA) and cryogenic separation. One suitable PSA adsorption system for use with the present invention is the three bed system illustrated in FIGS. 1 and 2 of U.S. Pat. No. 3,636,679 to Batta, incorporated herein to the extent pertinent.

In the practice of this invention, the oxygen-enriched feed gas discharged from air separator 116 must have at least 70% oxygen by volume, and the gas supplied by the afore-referenced PSA system typically is about 90% oxygen by volume and slightly above atmospheric pressure. As is known by the prior art, ozone generators of the silent electric discharge type operate more efficiently with higher oxygen content feed gas.

The oxygen-enriched feed gas in conduit 119 is introduced to the ozone generator 120 operating on the silent electric discharge principle utilizing either tubular or flat electrodes of a well-known design, as for example the afore-referenced Lowther type. As will be discussed hereinafter in greater detail, the ozone generator is operated with an ozone generation energy demand of less than that defined in equation (1), (in kwh/lb. $O_3$) and provides gas having between 4% and 8% by weight ozone.

The ozone-containing feed gas discharged from generator 120 into conduit 121 is introduced to ozone-water contactor 122 which may be the same general type as contactor 22 (FIG. 1). Any of the well-known types of gas-liquid contacting devices normally used in ozone-water contacting are suitable, as providing at least 80% and preferably 90% utilization of the ozone supplied by the feed gas. One suitable gas-liquid contacting device is a fixed submerged porous diffuser. In the diffused gas system, the feed gas is introduced at the bottom of the chamber through stationary porous diffuser discs. The ozonized and oxygenated water is discharged from contactor 122 through conduit 124 after it has absorbed or reacted with between 0.5 ppm. and 8 ppm. ozone. The exact quantity of oxygen and ozone dissolved into the water of contactor 122 depends upon the feed gas and the degree of mass transfer provided therein.

The ozone-depleted, oxygen-enriched gas is discharged from contacting chamber 122 through conduit 125, and preferably passed to ozone destruct unit 126 to decompose any residual ozone. The remaining oxygen-enriched gas is atmospherically vented through conduit 136 and valve 137 therein.

Figure 3:
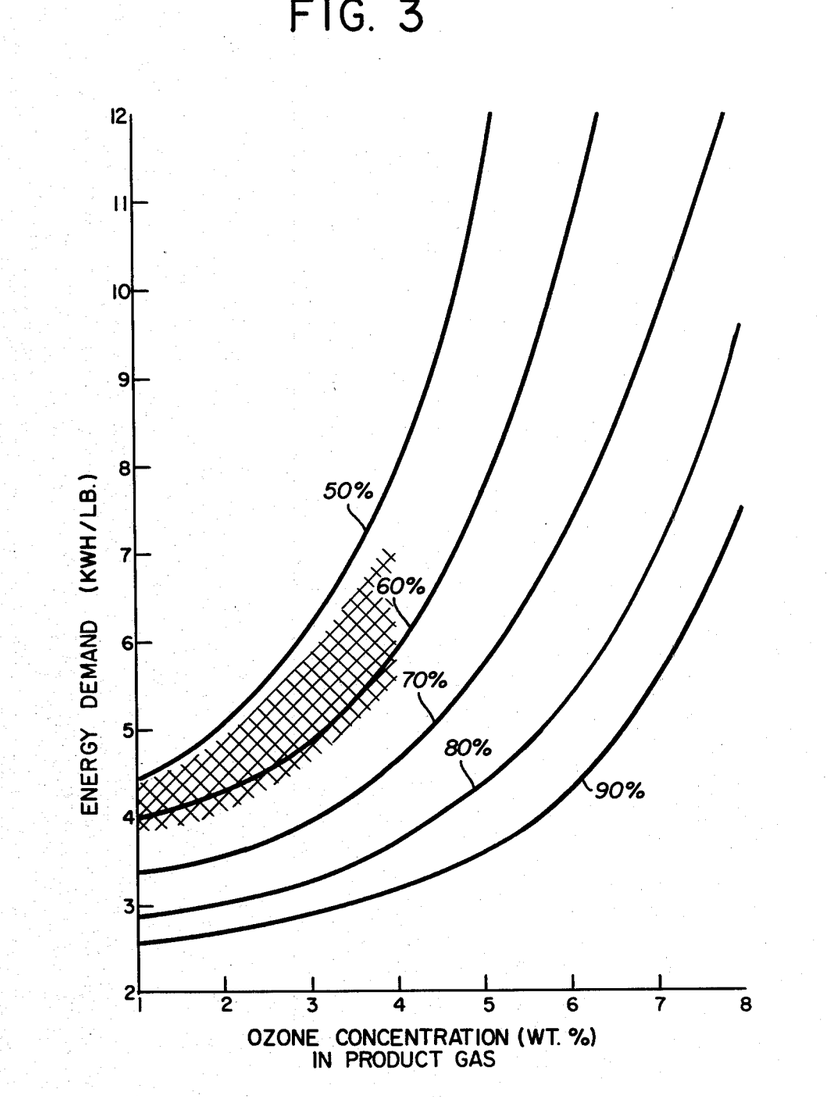
FIG. 3 is a graph illustrating the ozone generation energy demand $\eta$ as a function of the ozone concentration in the product gas obtained by silent electric discharge in oxygen-enriched feed gas of various oxygen concentrations and a dew point of about $-100°$ C., using a Lowther-type ozone generator.

FIG. 3 is a graph illustrating the ozone generation energy demand $\eta$(Kwh/lb. ozone) of the Lowther-type flat plate electrode generator as a function of the ozone concentration in the product gas, for several oxygen-enriched feed gas concentrations in the 50%–90% range and having a dew point of about $-100°$ C. It should be noted at the onset that lower figures of merit are desirable as reflecting a relatively low quantity of power required to generate one pound of ozone. The graph shows that for any particular ozone concentration in the product gas, the ozone generation energy demand is lower for higher oxygen concentrations in the feed gas. The graph also illustrates that the adverse effect of decreasing feed gas oxygen concentration is relatively small at low ozone concentrations in the product gas. For example, the ozone generation energy demand increases at a rate of only about 0.5 KWH/lb. ozone per 10% decrease in the feed gas oxygen concentration at 1 wt.% ozone. However, the adverse effect of decreasing feed gas oxygen concentration becomes increasingly severe at higher ozone concentrations in the product gas. For example, the energy demand increases at a rate of about 1.9 KWH/lb. ozone per 10% decrease in the feed gas oxygen concentration at 5 wt.% ozone—more than triple the rate at 1 wt. % ozone.

It will be recalled that because of dilution of fresh oxygen feed gas by the returned off-gas, the oxygen-enriched gas entering the ozone generator of a classical recycle system has about 55–65% oxygen (by volume). Accordingly, FIG. 3 illustrates that such ozone generator must operate at a low ozone concentration in the product gas to exhibit optimum performance (in terms of low figure of merit). The approximate operating band used with the classical recycle system is enclosed by the cross-hatched area in FIG. 3, i.e. less than 4 wt. % ozone and typically about 2 wt. % ozone.

Figure 4:
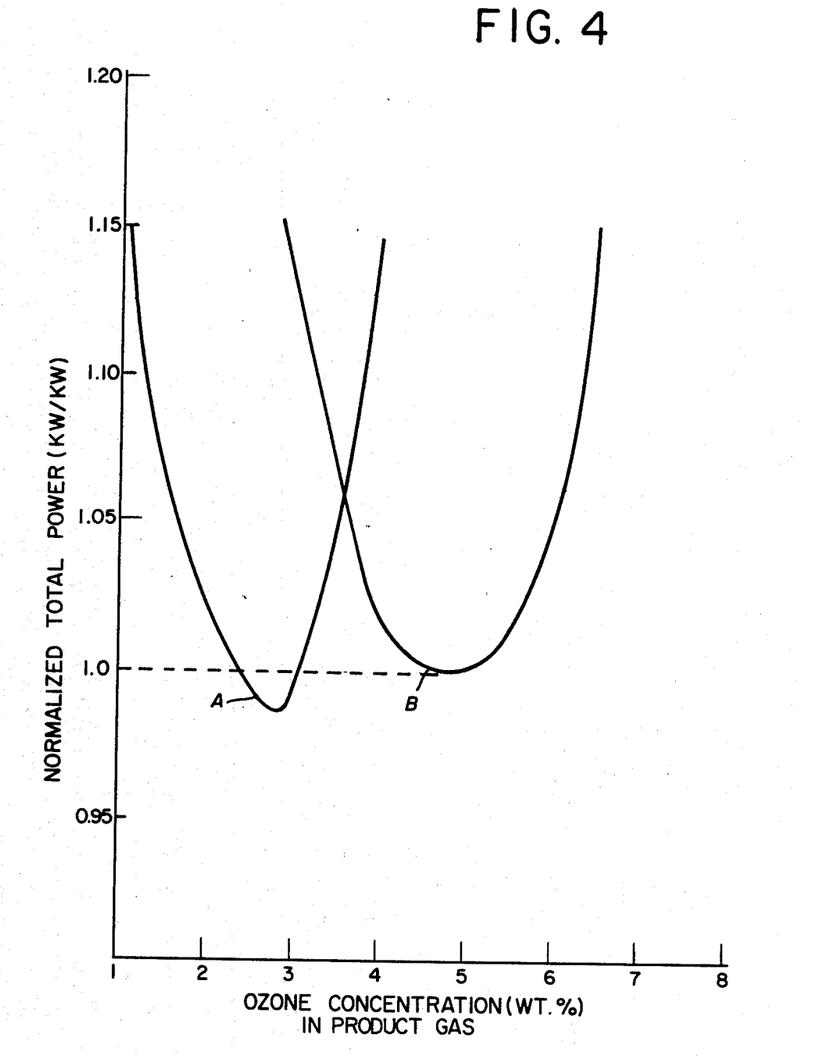
FIG. 4 is a graph showing the power requirements of (a) the classical recycle method and (b) the atmospheric venting method of this invention, both as a function of ozone concentration in the oxygen-enriched feed gas.

The FIG. 4 graphs illustrate the relationship between overall power requirements (oxygen production by air separation, and ozone generation) for the classical recycle water ozonation system of FIG. 1 (curve A) and the FIG. 2 embodiment of this method invention (curve B). Each curve is based on 1000 lb/day of ozone providing a 2 ppm ozone dose for a water stream of drinking or process water quality. Referring only to curve A at this time, it will be apparent that the classical recycle system is optimized at an ozone concentration of about 2.75 wt. %. At higher ozone generator output concentrations the power efficiency performance degrades substantially.

A comparison of FIGS. 1 and 2 illustrates that the apparatus required to practice the inventive method is relatively simple, and greatly reduces the number of essential components as compared with the FIG. 1 classical recycle system. Most importantly, both the drier 27 and recycle compressor 26(a) in FIG. 1 have been eliminated. These two components are typically high cost and high maintenance items, and in many installations a spare may also be required. Also, by increasing the oxygen purity of the feed gas to at least 70% by volume $O_2$ pursuant to this invention, the ozone generator is allowed to produce an ozone-in-oxygen containing gas of substantially higher ozone concentration than heretofore practicable (4–8% ozone by wt.), and this permits a size reduction in the ozone generator needed for a particular $O_3$ production rate. Another significant advantage from the standpoint of equipment requirements is that the higher ozone concentration gas supplied to the contactor permits size reduction of the ozone-water contacting chamber and all associated piping. The sum total of the above-described equipment changes is a substantial capital cost advantage for the inventive method.

Illustrative capital cost comparisons of equipment to practice the invention and the FIG. 1 classical recycle system are detailed in Table A for two cases. Case I is an 11 MGD water stream (treated wastewater) at a 10 ppm. ozone dose with no ozone residual in the disinfected water effluent. Case II is a 57 MGD water stream (drinking or process water quality) at a 2 ppm. ozone dose with a 0.4 ppm. ozone residual in the disinfected water effluent. In each instance the classical recycle system employs an ozone-in-oxygen containing gas of 2.5 wt. % $O_3$, while the atmospheric venting method employs an ozone-in-oxygen containing gas of 5% $O_3$ by weight.

TABLE A

CAPITAL COST COMPARISON*

| | Case I 11 MGD, 10 ppm $O_3$ dose and 0 ppm residual | | Case II 57 MGD, 2 ppm $O_3$ dose and 0.4 ppm residual | |
|---|---|---|---|---|
| | Recycle | Invention | Recycle | Invention |
| Air Separation | 42 | 68 | 57 | 68 |
| Ozone Generation | 22 | 22 | 26 | 22 |
| Recycle Compressor | 9 | 0 | 9 | 0 |
| Drier | 16 | 0 | 12 | 0 |
| Aftercooler | 2 | 0 | 2 | 0 |
| Diffusers | 1 | 1 | 3 | 1 |
| Piping | 6 | 2 | 6 | 2 |
| Building | 17 | 7 | 17 | 7 |

TABLE A-continued

| CAPITAL COST COMPARISON* | | | |
|---|---|---|---|
| Case I 11 MGD, 10 ppm O₃ dose and 0 ppm residual | | Case II 57 MGD, 2 ppm O₃ dose and 0.4 ppm residual | |
| Recycle | Invention | Recycle | Invention |
| 115 | 100 | 132 | 100 |

*Normalized direct costs

As is apparent from Table A, elimination of three components of the recycle system and reduction of other costs provides a 15% capital cost reduction for the high O₃ dose Case I and a 32% cost reduction for the low O₃ dose Case II.

We have also surprisingly discovered that under the operating conditions previously defined, the present method also provides power ozone production characteristics which are comparable to the classical recycle system. This is particularly unexpected when one realizes that according to this invention all of the oxygen in the off-gas released from the ozone-water contacting chamber is atmospherically vented, so that the overall oxygen utilization is below about 30%. By way of explanation, it has been observed that at low ozone dosage levels the quantity of oxygen-enriched feed gas contributing to the increase in dissolved oxygen content of the water stream is a large fraction of the total oxygen-enriched feed gas flow. This means that in the classical recycle system the make-up oxygen requirement for the feed gas (assumed to be the $O_2$ quantity dissolved in the disinfected effluent water plus that lost in the vent gas) is also relatively high. In fact, this make-up oxygen requirement is of the same magnitude as the oxygen-enriched feed gas production rate required for the inventive method with the ozone generator operated to produce high O₃ concentrations, i.e. 4–8% by wt. ozone.

As the water stream ozone dosage requirement and accordingly the ozone demand increases, the oxygen-enriched feed gas flow rate in both the classical recycle and atmospheric venting systems must also increase. Eventually, the quantity of oxygen contributing to the increase of the water stream dissolved oxygen content (as a portion of the $O_2$ quantity in the feed gas stream) drops significantly. At this point the classical recycle system is preferable to the atmospheric venting system since the vent gas now becomes the dominant source of oxygen loss in this system. In contrast, the major portion of the off-gas in the classical recycle system is continuously returned to the ozone generator and therefore not lost. In particular, the power requirements for Case I and Case II are shown in Table B.

TABLE B

| POWER COST COMPARISON* | | | | |
|---|---|---|---|---|
| | Case I 11 MGD, 10 ppm O₃ dose and 0 ppm residual | | Case II 57 MGD, 2 ppm O₃ dose and 0.4 ppm Residual | |
| | Recycle | Invention | Recycle | Invention |
| Air Separation | 13.6 | 46 | 28.5 | 46 |
| Ozone Generation | 57.1 | 53.5 | 60.5 | 53.5 |
| Vent Blower | 0 | 0.5 | 0 | 0.5 |
| Recycle Compressor | 9.9 | 0 | 8.7 | 0 |
| Drier | 2.3 | 0 | 1.7 | 0 |
| Total: | 82.9 | 100.0 | 99.4 | 100.0 |

*Normalized

As shown, the present invention provides comparable power requirements with the classical recycle system at relatively low ozone doses as Case II (2 ppm O₃). However, at the high ozone dose level of Case I (10 ppm O₃), the atmospheric venting system of FIG. 2 is at a substantial power disadvantage. As expected, the atmospheric venting system has much higher air separation (oxygen production) requirements for both illustrated low and high ozone dose cases. However, because of the higher $O_2$ purity of the oxygen-enriched feed gas to the ozone generator in the atmospheric venting system relative to the classical recycle system, the ozone generation power requirements are lowest for the former. The added recycle power demands for recycle compression and drying in the classical recycle systems serve to further reduce the power differential caused by the high air separation power requirements of the present invention.

Another aspect of this invention is the unexpected discovery that the atmospheric venting method of this invention is optimized at higher ozone concentrations of the ozone-in-oxygen containing gas than heretofore practiced. Referring again to FIG. 3, this graph shows that the ozone production energy demand for the silent electric discharge-type of ozone generator is strongly dependent on the ozone concentration of the product gas from the generator. One might conclude that this strong dependency would provide the same relationship for the atmospheric venting system as in the classical recycle system. In particular, it would be reasonable to expect optimum performance at low ozone concentrations in the product gas from the generator. Surprisingly, as is demonstrated by curve B of FIG. 4, we have found otherwise and the optimum power performance in terms of ozone concentration for the atmospheric venting method of this invention is at substantially higher ozone concentration than normally practiced in the ozone generator for the classical recycle system. In particular, curve B shows that from the standpoint of total power requirement, the optimum range for the atmospheric method of this invention when using an ozone generator having the power characteristics illustrated in FIG. 3 is about 4–5.5 wt.% ozone in the O₃ generator product gas. In contrast, the optimum range for the classical recycle system is about 2–3.2 wt.% ozone (curve A). By way of direct comparison, at 4 wt.% ozone the present method requires 1.01 kw/kw whereas the classical recycle system requires 1.15 kw/kw to perform the same function using the same type of equipment—a 13% increase.

This surprising result is attributed to several effects. As an initial consideration, by avoiding recirculation of the ozone-water contactor off-gas the oxygen purity in the oxygen-enriched feed gas to the ozone generator may be independently controlled. Accordingly, the atmospheric venting method allows one to reduce the inherent power penalty at higher ozone concentrations (see Table B) by operating along the ozone generation curve yielding the lowest power. For example with the Lowther type silent electric discharge generator represented by FIG. 5, one may readily operate at the optimum level of about 5 wt.% ozone. Another reason is that by eliminating the recycle of a gas containing a higher quantity of moisture, the dew point of the oxygen-enriched feed gas to the ozone generator is reduced to about $-100°$ C. It is well known that silent electric ozone generators operate more efficiently with relatively dry feed gas. These aforedescribed combined effects provide a relatively low overall power requirement (air separation and ozone generation) as compared to the prior art classical recycle system, at an ozone concentration of the ozone-in-oxygen containing gas in the range of 4–8% ozone by wt.

Curve B of FIG. 4 indicates that total power for the high end of the 4–8% ozone range is substantially higher than the low end of this range. Notwithstanding preference for 4–5.5% ozone by wt., at higher ozone concentrations the capital cost of the system tends to decrease as a result of reduction in the size of the air separator, the ozone-water contactor and piping. Since the atmospheric venting system provides a substantial equipment advantage at 5% ozone in a low ozone dose embodiment (Table A, Case II), an overall advantage (equipment costs plus power) is still achievable at higher ozone concentrations in the generator product gas even though the power cost rises. We have determined that with ozone-in-oxygen containing gas concentrations as high as 8% ozone by wt., the atmospheric venting method of this invention is superior to the classical recycle system in terms of overall equipment and power. Accordingly, this represents an upper limit for the instant method.

While the exact design of the silent discharge electrode type of ozone generators useful in the practice of this invention is not critical, they must be efficient in terms of power required to produce a given quantity of ozone, as reflected in equation (1). If the ozone generation energy demand in the 4–8% ozone-in-oxygen concentration range is above the equation (1) level, it is more economical to practice the prior art classical recycle system at lower output ozone concentrations from the generator.

In a preferred embodiment the ozone generation energy demand in kwh/lb.-$O_3$ is less than that defined by equation (2) as follows:

$$\eta = 1/(0.44 - 0.035x)$$

where x is the ozone weight % concentration in the ozone-in-oxygen containing gas.

Figure 5:
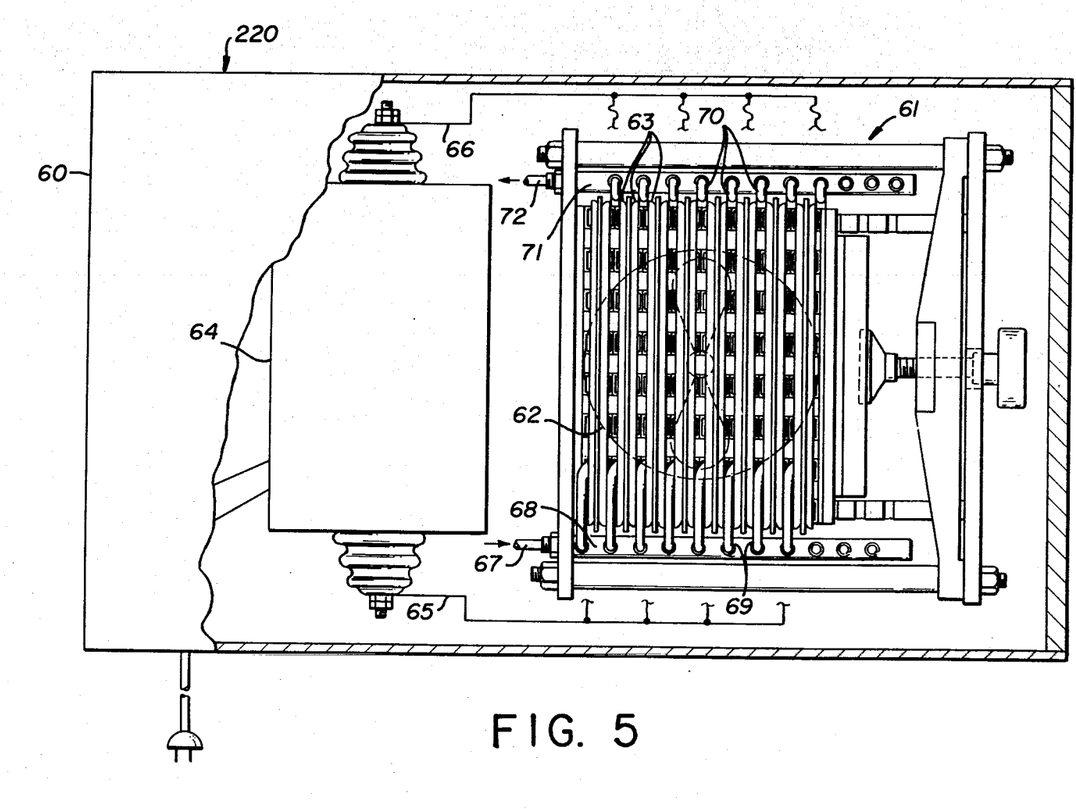
FIG. 5 is a schematic view, taken in cross-section with parts cut away, of a Lowther-type flat electrode plate ozone generator suitable for use in the method of this invention.

A suitable ozone generator 220 of the Lowther type (used for the previously described comparisons) is schematically illustrated in FIG. 5. It includes housing 60 containing a corona reactor core 61 and blower 62. The corona reactor core 61 comprises a plurality of individual air tight cells 63. Each corona cell 63 comprises two planar, uniformly spaced metallic electrodes which define an air tight corona discharge chamber therebetween. Each electrode has a bare exterior surface exposed to ambient while the interior surfaces of the two electrodes are covered with a ceramic dielectric. The electrodes may be rectangular in shape and are provided with a flared edge such that the opposing edges of the two electrodes are curved away from each other. The electrodes are spaced apart by an insulating spacer gasket, preferably made of silicon rubber which is positioned around the entire peripheral edge of the two opposing electrodes. Each electrode is also provided with an appropriate inlet and outlet orifice for feeding oxygen-enriched feed gas into the corona cell and for withdrawing an ozone-in-oxygen-containing gas from each cell. The cells also have a metallic heat sink clamped to each of the exposed external metallic surfaces of the corona cell electrodes.

In operation, electric power is supplied to the corona reactor core 61 from the transformer 64 through the electrical leads 65 and 66. The oxygen-enriched feed gas is introduced to the plurality of corona reactor cells in the corona reactor core 61 from the oxygen production source through conduit 67, inlet manifold 68 and the individual inlet tubes 69. The ozone-in-oxygen-containing gas is removed from the plurality of corona reactor cells making up the corona reactor core through the individual outlet tubes 70, outlet manifold 71 and outlet conduit 72, and is thereafter fed to the ozone contactor. The ozone corona reactor core is cooled by means of the blower 62 which draws air upwardly through the bank of corona reactor cells making up the corona reactor core.

Another suitable type of silent electric discharge ozone generator for practicing the method of this invention is the water and dielectric liquid cooled tubular apparatus manufactured and sold by PCI Ozone Corporation, One Fairfield Crescent, West Caldwall, N.J.

EXAMPLE

Tables C and D list the key detailed mass balances and stream compositions for the FIG. 1 classical recycle system and FIG. 2 atmospheric venting system of this invention used in the case II specifications (57 MGD water stream, 2 ppm ozone dose and 0.4 ppm ozone residual) of Table A (equipment comparison) and Table B (power comparison).

Although preferred embodiments of the invention have been described in detail, it will be appreciated that other embodiments are contemplated, along with modifications of the disclosed features, as being within the scope of the invention.

TABLE C

| | | | CLASSICAL RECYCLE SYSTEM | | | |
|---|---|---|---|---|---|---|
| FIG. 1 Stream No. | Mass Flow* (ppd) | $O_2$ | $N_2$ | Composition* Ar | $CO_2$ | $O_3$ |
| 17 | 14,028 | 90% | 6% | 4% | — | — |
| 28 | 10,344 | 55.9% | 40.7% | 2.2% | 1.2% | — |
| 34 | 19,468 | 6 | 14.5 | 0.5 | 20 | — |
| 24 | 22,832 | 18.8 | 7.8 | 1.3 | 19.6 | 0.4 |

TABLE D

| | | | ATMOSPHERIC VENTING SYSTEM | | | |
|---|---|---|---|---|---|---|
| FIG. 2 Stream No. | Mass Flow* (ppd) | $O_2$ | $N_2$ | Composition* Ar | $CO_2$ | $O_3$ |
| 119 | 20,430 | 90% | 6% | 4% | — | — |
| 121 | 20,430 | 86.5% | 6.1% | 4.1% | — | 3.3% |
| 136 | 19,238 | 66.4% | 29.9% | 2.4% | 1.1% | 0.2% |
| 134 | 19,468 | 6 | 14.5 | 0.5 | 20.0 | — |
| 124 | 20,340 | 15.9 | 5.8 | 1.4 | 19.3 | 0.4 |

*Water-free basis
All composition percent are by volume and all other numbers are mg/l.

What is claimed is:

1. In a method for ozonation of a water stream by separating air to produce oxygen-enriched feed gas, generating ozone in said feed gas by silent electric discharge to provide ozone-containing feed gas, contacting said water stream and said ozone-containing feed gas to dissolve ozone and oxygen in said water stream, atmospherically venting ozone-depleted gas from said contacting, and discharging the ozonized and oxygenated water from said contacting; the improvement comprising:

(a) producing at least 70% oxygen by volume as said oxygen-enriched feed gas;

(b) generating between 4% and 8% by weight ozone in said silent electric discharge such that the figure of merit $\eta$, representing the ozone generation energy demand in kwh/lb-$O_3$, is less than that defined by the equation:

$$\eta = 1/(0.34 - 0.033x)$$

wherein x is the ozone weight % concentration in the so-generated ozone-containing feed gas; and (c) performing said contacting of said water stream and said ozone-containing feed gas to dissolve between 0.5 ppm and 8 ppm ozone in said water stream.

2. A method according to claim 1 in which x is between 4 and 5.5.

3. A method according to claim 1 in which at least 90% of the ozone in said ozone-containing feed gas is dissolved in said water stream.

4. In a method of contacting a water stream with ozone for purification thereof wherein air is separated to produce an oxygen-enriched feed gas, ozone then being generated in said feed gas by silent electric discharge to provide ozone-containing feed gas, contacting the water stream with the ozone-containing feed gas to dissolve ozone and oxygen in the water stream, atmospherically venting the ozone depleted gas from the contacting step, and discharging the ozonized water; the improvement comprising:

(a) producing at least 70% oxygen by volume as said oxygen-enriched feed gas from the air separating step;

(b) generating between 4% and 8% by weight of ozone in said silent electric discharge such that the figure of merit $\eta$, respesenting the ozone generation energy demand in Kwh/lb-$O_3$ is less than that defined by the equation: $\eta = 1/(0.44 - 0.35X)$ wherein x is the ozone weight % concentration in the so-generated ozone-containing feed gas; and (c) contacting said water stream and said ozone-containing feed gas in a manner such as to dissolve between 0.5 ppm and 8 ppm ozone in said water stream.

5. A process as in claim 1 or 4, wherein only a single fraction of oxygen-enriched feed gas is produced.

* * * * *

UNITED STATES PATENT AND TRADEMARK OFFICE
CERTIFICATE OF CORRECTION

PATENT NO. : 4,352,740

DATED : October 5, 1982

INVENTOR(S) : Ronald J. Grader et al

It is certified that error appears in the above-identified patent and that said Letters Patent is hereby corrected as shown below:

Column 14, line 29: reads "A process as in claim 1 or 4, wherein only a single"

should read -- A method as in claim 1 or 4, wherein only a single --.

Signed and Sealed this

Twenty-sixth Day of February 1985

[SEAL]

Attest:

DONALD J. QUIGG

Attesting Officer  Acting Commissioner of Patents and Trademarks

UNITED STATES PATENT AND TRADEMARK OFFICE
CERTIFICATE OF CORRECTION

PATENT NO. : 4,352,740

DATED : October 5, 1982

INVENTOR(S) : RONALD J. GRADER ET AL

It is certified that error appears in the above-identified patent and that said Letters Patent is hereby corrected as shown below:

Column 14, line 21: reads "defined by the equation: $\eta = 1/(0.44-0.35X)$"

should read -- defined by the equation:

$\eta = 1/(0.44-0.035X)$ --

Signed and Sealed this

Sixth Day of August 1985

[SEAL]

Attest:

DONALD J. QUIGG

Attesting Officer     Acting Commissioner of Patents and Trademarks

REEXAMINATION CERTIFICATE (493rd)
United States Patent [19]
Grader et al.

[11] B1 4,352,740
[45] Certificate Issued  Apr. 22, 1986

[54] WATER OZONATION METHOD

[75] Inventors: Ronald J. Grader, East Amherst; Richard P. Johansen, Williamsville, both of N.Y.

[73] Assignee: Linde Aktiengesellschaft, Wiesbaden, Fed. Rep. of Germany

Reexamination Request:
No. 90/000,711, Jan. 16, 1985

Reexamination Certificate for:
Patent No.: 4,352,740
Issued: Oct. 5, 1982
Appl. No.: 119,671
Filed: Feb. 8, 1980

Certificate of Correction issued Aug. 6, 1985.

Certificate of Correction issued Feb. 26, 1985.

[51] Int. Cl.$^4$ ............................................. C02F 1/78
[52] U.S. Cl. ................................. 210/760; 210/764; 422/28

[56] References Cited

U.S. PATENT DOCUMENTS

| | | | |
|---|---|---|---|
| 3,660,277 | 5/1972 | McWhirter et al. | 210/604 |
| 3,732,163 | 5/1973 | Lapidot | 210/760 |
| 3,748,262 | 7/1973 | Lee et al. | 210/760 |
| 3,856,671 | 12/1974 | Lee et al. | 210/760 |
| 4,132,637 | 1/1979 | Key et al. | 210/604 |
| 4,178,239 | 12/1979 | Lowther | 210/604 |
| 4,256,574 | 3/1981 | Bhargava | 210/760 |

OTHER PUBLICATIONS

Evans III, Francis L., Ozone in Water and Wastewater Treatment, Ann Arbor Science Publishers Inc., 1972, pp. 1-40.

Rosen, Harvey M., Ozone Generation and Its Relationship to the Economical Application of Ozone in Wastewater Treatment, Ozone In Water Treatment, pp. 101-122.

Union Carbide, Ozonation Systems, 1977, pp. 1-8.

Lawrence, John & Cappelli, Frank P., Ozone in Drinking Water Treatment: A Review, The Science of Total Environment, 7, (1977), 99-108.

Johansen et al., "Comparison of Once-Through and Recycle Ozone Systems Using High Purity Oxygen", Water Pollution Control Federation Conference (WPCFC), Philadelphia, 1977.

Johansen et al., "Comparison of Air and Oxygen Recycle Ozonation Systems", Sym. on Ad. Ozone Tech. in Toronto, Int'l. Ozone Inst., Nov., 1977.

H. M. Rosen–"Use of Ozone and Oxygen in Advanced Wastewater Treatment", Journal WPCF, vol. 45, No. 12, Dec. 1973, pp. 2521-2536.

H. M. Rosen–"Wastewater Ozonation: A Process Whose Time Has Come" Civil Engineering-ASCE, Mar. 1976, pp. 65-69.

H. M. Rosen–"Integrated Ozonation Systems", Presented at The First International Symposium and Exposition, Washington, D.C., Dec. 2-5, 1973.

*Primary Examiner*—Peter A. Hruskoci

[57] ABSTRACT

A method for ozonation of a water stream by providing at least 70% by volume oxygen feed gas, generating 4–8% by wt. ozone in such gas by silent electric discharge with low power per unit ozone, contacting with water to dissolve ozone, and atmospherically venting ozone-depleted gas from the contacting.

// B1 4,352,740

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

Claim 5 is determined to be patentable as amended.

New claims 6-22 are added and determined to be patentable.

5. A [process] *method* as in claim 1 or 4, wherein only a single fraction of oxygen-enriched feed gas is produced.

*6. A method according to claim 1 wherein the oxygen enriched feed gas has a composition of 90-99% oxygen by volume.*

*7. A method according to claim 1 wherein said water stream is a stream of approximately drinking water quality.*

*8. A method according to claim 1 wherein said water stream flows at a rate of at least 11 million gallons per day (MGD).*

*9. A method according to claim 7 wherein the water stream has a flow rate of at least 57 million gallons per day (MGD).*

*10. A method according to claim 1 wherein x is about 5.*

*11. A method according to claim 1 wherein all the overall oxygen utilization is below about 30%.*

*12. A method according to claim 9 wherein the overall oxygen utilization is below about 30%.*

*13. A method according to claim 12 in which x is between 4 and 5.5.*

*14. A method according to claim 12 wherein x is about 5.*

*15. A method according to claim 13 wherein the oxygen enriched feed gas has a composition of 90-99% oxygen by volume.*

*16. A method according to claim 15 wherein x is about 5.*

*17. A method according to claim 1 wherein the oxygen enriched feed gas is produced by separating air by the pressure swing adsorption system and the oxygen concentration is about 90% by volume.*

*18. A method according to claim 17 wherein the water stream is a stream of approximately drinking water quality and flows at a rate of at least 57 million gallons per day (MPG).*

*19. A method according to claim 18 in which x is between 4 and 5.5.*

*20. A method according to claim 19 wherein x is about 5.*

*21. A method according to claim 19 wherein the overall oxygen utilization is below about 30%.*

*22. A method according to claim 20 wherein the overall oxygen utilization is below about 30%.*

* * * * *